United States Patent [19]
Polizzotti et al.

[11] Patent Number: 6,106,653
[45] Date of Patent: Aug. 22, 2000

[54] WATER VAPOR PLASMA TREATMENT OF GLASS SURFACES

[75] Inventors: Richard S. Polizzotti, Milford; Mohsen Yeganeh, Piscataway; Shawn M. Dougal, High Bridge, all of N.J.

[73] Assignee: Exxon Research and Engineering Co., Florham Park, N.J.

[21] Appl. No.: 09/052,045

[22] Filed: Mar. 31, 1998

[51] Int. Cl.[7] .................................................... B32B 31/00
[52] U.S. Cl. .................................. 156/272.2; 427/348.3; 427/422; 427/316; 427/374.1; 156/73.1; 156/73.3; 156/379.6
[58] Field of Search ........................... 427/398.3, 374.1, 427/37, 38, 422, 316; 156/73.1, 73.3, 379.6, 272.2

[56] References Cited

U.S. PATENT DOCUMENTS

| | | | |
|---|---|---|---|
| 3,925,178 | 12/1975 | Gesser et al. ............................ | 204/165 |
| 4,675,205 | 6/1987 | Boncoeur et al. . | |
| 5,543,017 | 8/1996 | Uchiyama et al. ....................... | 204/169 |

FOREIGN PATENT DOCUMENTS

| 0391068 | 4/1989 | European Pat. Off. ........... C08J 5/12 |
| 0396329 | 11/1990 | European Pat. Off. ......... B01D 69/00 |

OTHER PUBLICATIONS

V. Krishnamurthy et al, Journal of Nat'l Science "Argon Plasma Treatment of Glass Suf"—Glass Surface, 1989.

*Primary Examiner*—Merrick Dixon
*Attorney, Agent, or Firm*—Estelle C. Bakun

[57] ABSTRACT

The density of hydroxyl groups present on the surface of glass, such as E-glass fibers, is increased by subjecting the surface to a radio frequency induced gas plasma containing water vapor. Surfaces so treated exhibit enhanced adsorption of hydrolyzed organo silane coupling agents applied to improve adhesion between glass fibers and resin matrices in the manufacture of reinforced composites.

8 Claims, 4 Drawing Sheets

WATER VAPOR PLASMA TREATMENT OF GLASS SURFACES

FIELD OF THE INVENTION

The present invention relates to a process for increasing the number density of hydroxyl groups present on glass surfaces by subjecting such surfaces to a water vapor plasma treatment.

BACKGROUND OF THE INVENTION

Fiberglass reinforced resinous composites and laminates are well known materials used in many applications, including oil field piping as well as automotive, marine and building applications. Articles are generally prepared by embedding continuous or chopped fiberglass filaments or bundles in a curable resinous binder such as a polyester or epoxy resin, followed by shaping and curing the shaped structure. The fiberglass serves to reinforce the structure giving rise to articles having improved strength and stress and shear resistance.

In order to maximize mechanical properties as well as chemical resistance of the structure, it is necessary that a strong bond be developed between the resin matrix and the fiberglass reinforcement surfaces at their interface. The development of this strong bond may be achieved by coating the fiberglass with a hydrolyzed organofunctional silane coupling agent having the general formula $(X)_3$ Si-R wherein X is a hydrolyzable halogen or alkoxy group and R is an organic radical having functionality which is either capable of reacting with the curable matrix resin or at least highly compatible with the matrix resin. The hydrolyzed silane is initially adsorbed onto the surface of the glass and forms hydrogen bonds with free hydroxyl groups normally present on the glass surface. Subsequent heating of the coated glass surface converts these bonds to covalent siloxane bonds in accordance with the following reaction schematic.

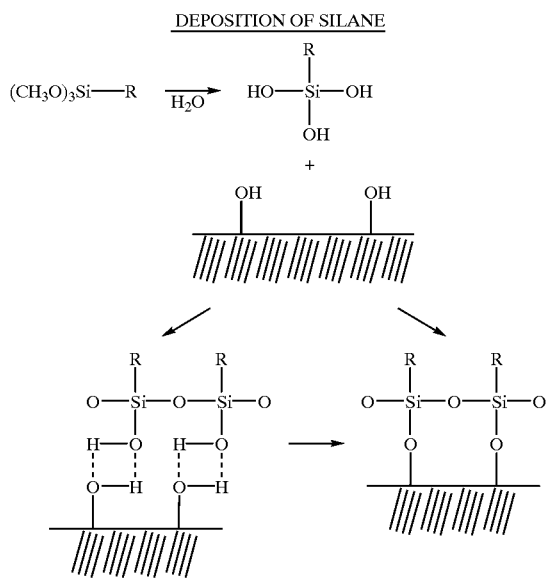

Accordingly, it is evident that the quantity of hydrolyzed silane which can be sorbed onto and bonded to the glass surface is a function of the number density of hydroxyl groups available on the glass surface with which the hydrolyzed silane can hydrogen bond.

The present invention provides a method for increasing the number density of hydroxyl groups on glass surfaces by subjecting such surfaces to a water vapor plasma treatment.

It is known in the prior art to subject various substrates to a plasma gas treatment to alter the surface characteristics of the substrate. For example, B. Das discloses in Sample J, 28 (2), 1992 at pages 33–39 the cold plasma treatment of pre-sized glass fiber bundles in the presence of an activated gas such as argon, oxygen, ammonia, Freon™ or a mixture of oxygen and Freon. The authors note that some sort of surface modification of the sized fiber surface is achieved as evidenced by differences in water wettability of the treated fibers vs. the untreated fibers. Similarly, V. Krishnamurthy et al. disclose in Journal of Mats Sci 24 (1989) at pages 3345–3352 the argon gas plasma treatment of glass fibers to etch their surface and increase the surface wettability, followed by plasma polymerization onto the treated surface of selected monomers designed to enhance the adhesion of the treated fibers to polymer matrices.

U.S. Pat. No. 4,675,205 discloses the surface treatment of a material, such as an epoxy/fiberglass composite, by subjecting it to a hot gaseous plasma which also may contain a reactive gas such as water vapor or $BCl_3$. The treatment is disclosed to enhance the adhesion of ceramic materials subsequently coated on the plasma treated surfaces.

However, none of these references disclose exposure of clean glass or fiberglass surfaces to a water vapor-containing plasma and the resulting generation of an increased number density of hydroxyl groups on such surfaces.

It is also known in the art to subject various substrates to glow discharge (plasma) in order to clean or sterilize such surfaces. Such cleaning is required to prepare strongly adhering films via vacuum evaporation and is commonly used in the coating and electronics industry. Glow discharge is also used in the medical field for the cleaning and sterilization of microscope slides and surgical instruments.

SUMMARY OF THE INVENTION

The present invention provides a process for increasing the number of hydroxyl groups on a clean glass surface comprising contacting said surface with a radio frequency induced gas plasma containing water vapor.

DETAILED DESCRIPTION OF THE INVENTION

Figure 1:
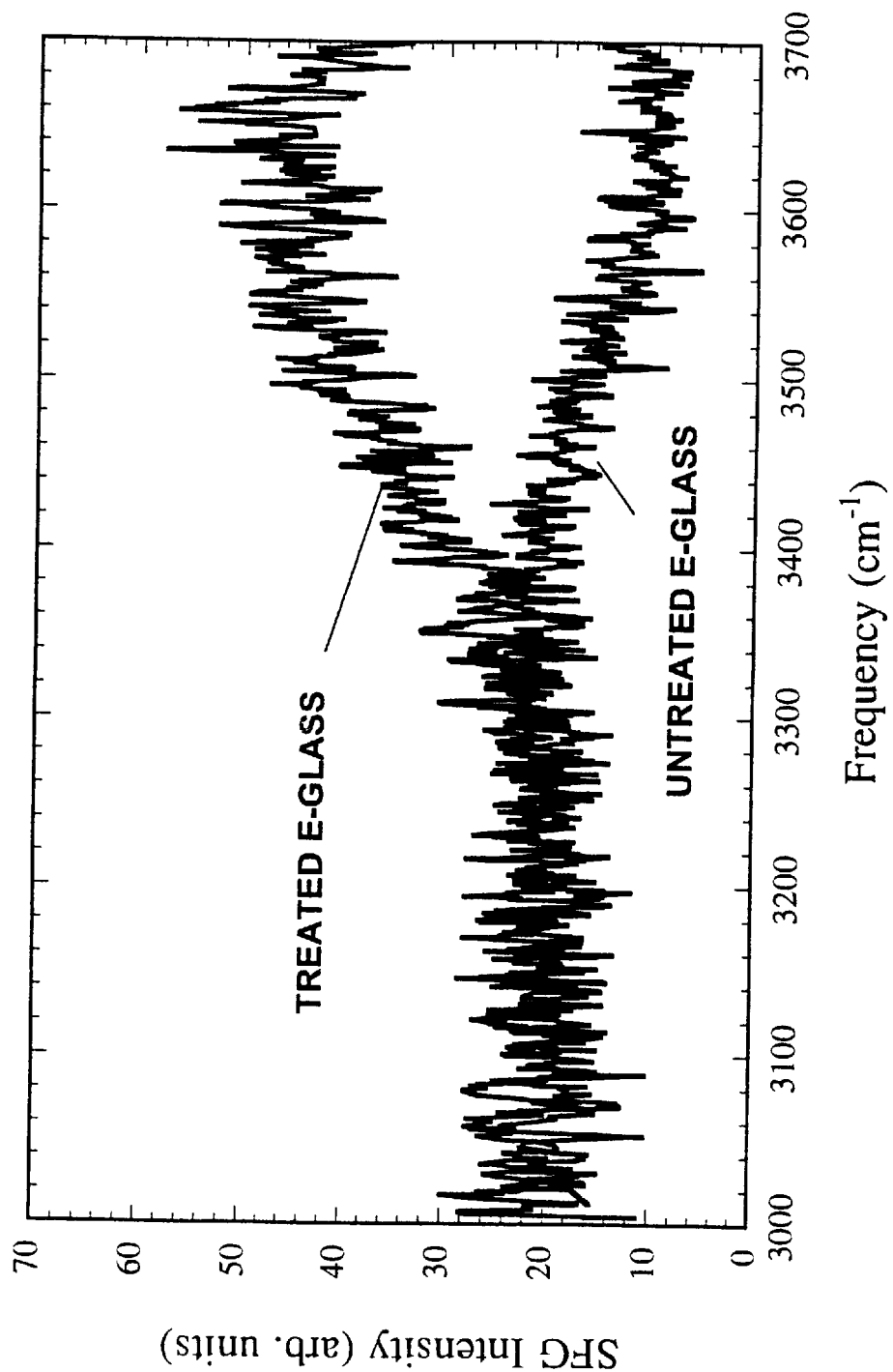
FIG. 1 depicts the sum-frequency generation (SFG) spectra showing the hydroxyl group density of a glass surface before and after the plasma treatment of this invention.

Plasma gas may be generated by radio frequency (RF) ionization of gas molecules, usually in a reduced pressure chamber. Initiation of discharge within the chamber develops a plasma gas which comprises a mix of positively and negatively charged particles arranged in such a way as to shield externally and internally generated electrostatic fields. Within these regions, activating gases or vapors display a wide variety of chemical properties which differ from those encountered under normal conditions. Particle separation within the plasma creates a potential which becomes the primary source of surface activation causing ionic and free radical surface reactions. Water molecules present in the RF plasma or the plasma glow region becomes highly excited, ionized and disassociated.

In accordance with this invention, a method is provided for increasing the density of hydroxyl groups present on the surface of clean glass. By the term "clean" glass is meant glass which is free of any preapplied surface coatings such as glass sizing, coupling agents or adhesive agents.

Suitable glass includes silica, alumina, silicate and other oxide glasses.

The most preferable glass is E-glass which contains about 55 wt % $SiO_2$ as the main component with the remainder being oxides of other elements such as Al, Ca, Na, B and C. The glass may be in the shape of fibers, films or wafers, or may be particulate glass which is used as filler or a catalytic substrate in a number of applications. The invention is particularly applicable to continuous drawn fiberglass fibers (bundles) which are used as reinforcing fibers in the manufacture of polymer bound composites.

The glass surface treatment can be carried out by subjecting the glass surface to an RF induced gas plasma containing water vapor under conditions such that the water molecules become highly excited, ionized and disassociated. In this condition, the water quickly hydrates the glass surface which it contacts leading to increased hydroxyl group density on the glass surface. The process may be conducted at ambient temperature by passing the glass, e.g., continuous glass fibers, through a plasma torch or glow discharge which also contains added water. The water may be sprayed into the discharge in the form of a liquid or steam, or may be applied to the glass surface prior to entry of the glass into the discharge. The process may be conducted in the atmosphere in the presence of ordinary air or may be conducted in a reaction chamber in the presence of air or other gases such as nitrogen, helium or argon. Preferably, the air surrounding the glass surfaces is at least 30% saturated, more preferably at least 50% saturated with water vapor during the plasma treatment. The process may be carried out at temperatures in the range of about 20° C. to 100° C., but is preferably carried out at ambient temperature, about 25° C.

On a laboratory scale, the process is best illustrated using an inductively coupled plasma reactor, such as Bronson/IPC 3000 or a Harrick Scientific Corporation PDC-32G, operating at a frequency of 13–14 MHz and a power level of from about 50 to 150 watts. The glass sample to be treated is placed in the reaction chamber (also referred to as the vacuum envelope) which also contains a source of water vapor. The water vapor source may be simply water drops or a container of water placed in the chamber or water in the form of ice. Alternatively, the chamber may be equipped with a water inlet valve which permits the introduction of a water vapor or steam spray from outside the chamber.

The reaction chamber is then evacuated using a vacuum pump down to a pressure of about 0.01 to 0.05 torr. Once the equilibrium partial pressure of water in the chamber at ambient temperature is reached, the glass sample is exposed to the low pressure RF of the plasma generator for a period of time ranging from about 30 seconds up to about 15 minutes, depending on the nature of and size of the glass sample.

The process may be carried out in the presence of air and/or one or more relatively inert gases such as argon, nitrogen or helium. Reactive gases such as chlorofluorocarbon or ammonia should be avoided as these may lead to the generation of unwanted reactive species on the glass surface.

As indicated above, the density of the hydroxyl groups on the surface of glass exposed to the water vapor plasma treatment of the invention is increased as compared with the untreated glass or glass-plasma-treated in the absence of added water. This density increase in hydroxyl groups means that glass will adsorb more of the hydrolyzed coupling agents which initially form hydrogen bonds with the hydroxyl groups present on the glass surface when applied to such surface. Typical of such coupling agents prior to hydrolysis include methyl trichloro silane, methyl trimethoxy silane, vinyl triethyoxy silane, gamma (amino) propyl triethoxy silane and other mono or polyfunctional alkoxy silanes as are well known in the art.

The following Examples are illustrative of the invention.

EXAMPLE 1

A thin layer of E-glass was deposited on the surface of an equilateral sapphire prism using laser ablation. The coated prism was then placed in the reaction chamber of a Harrick Scientific Corp. model POC-32G plasma generator (designed to operate at a frequency of about 13 MHz). After evacuating the chamber down to 30 mTorr using a vacuum pump, the plasma generator was activated at a power of 100 W. Approximately 1 mml of deionized water was injected into the low pressure RF plasma chamber until a gray-blue glow was obtained. The sample was exposed to this environment for 2 minutes.

The density of the hydroxyl groups present on the surface of the glass coated prism was determined both before and after the treatment described above using a sum-frequency generation spectroscopy (SFG) technique. The SFG spectra of the E-glass surface before and after the water vapor plasma treatment is shown in FIG. 1. The SFG resonance intensity at 3680 $cm^{-1}$ is generated by the surface hydroxyl group of the E-glass and a marked increase in this resonance is shown for the treated sample. This is indicative of an increase in the surface OH density. The increase in the surface hydroxyl group activates the nucleation of small water clusters with SFG resonance intensity of ~3550 $cm^{-1}$. FIG. 1 also depicts a marked increase in the water clusters for the plasma treated sample.

Figure 2A:
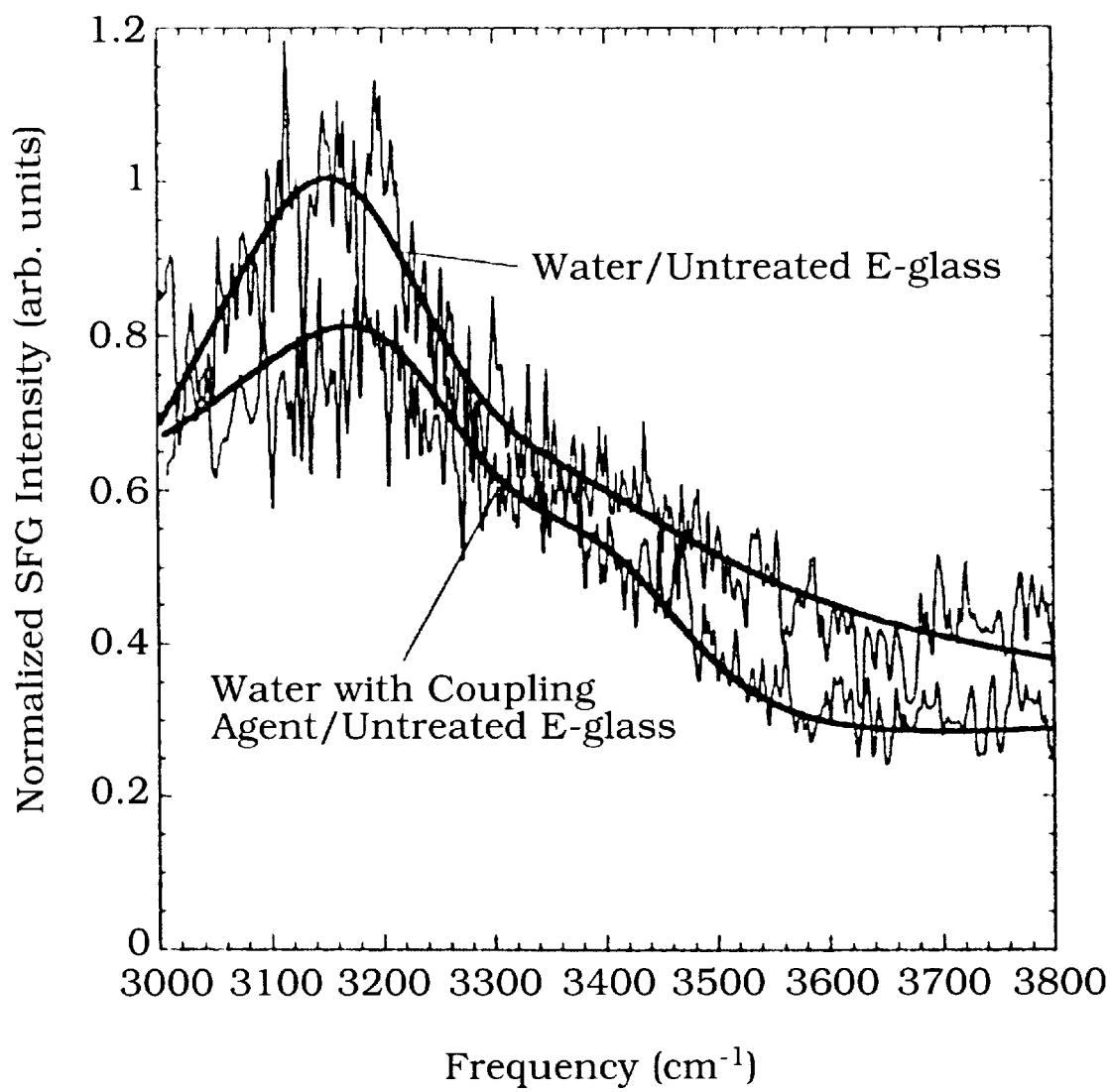
FIG. 2 depicts the SFG spectra showing the adsorbed hydrolyzed silane concentration on a glass surface before and after the plasma treatment of this invention.
Figure 2B:
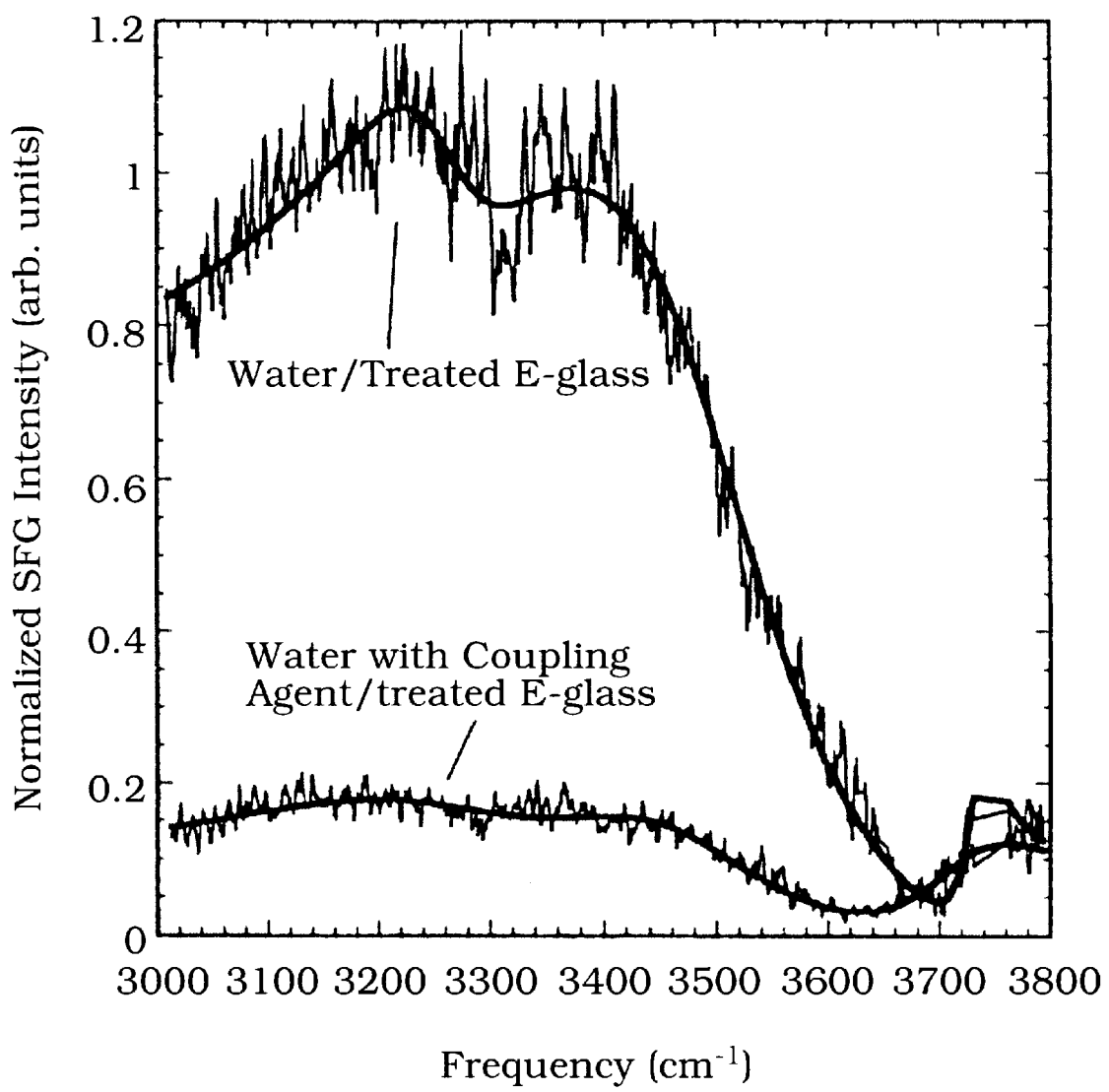

In FIG. 2(A) the SFG spectra of water/untreated E-glass and water containing coupling agent/untreated E-glass interfaces are compared. In FIG. 2(B) a similar comparison is displayed for a treated E-glass sample.

The SFG water signal intensities at ~3200 $cm^{-1}$ and ~3400 $cm^{-1}$ were reduced upon the addition of the coupling agent into the aqueous solution.

This reduction indicates a displacement of water and thus adsorption of coupling agent onto the E-glass substrate. SFG spectra, shown in FIG. 2, exhibit a greater reduction in the interface water signal for the plasma treated substrate. This indicates a higher interfacial bond number density between the substrate and coupling agent.

EXAMPLE 2

A thin wafer (0.4 mm. thick and 1.0 cm in diameter) was cut and polished (using 0.4 micron diamond phase) from a 1.0 cm rod of E-glass. The sample was placed on a quartz plate in a furnace in ambient air at 815° C. for 30 min. The sample was then transferred hot from the furnace to the XPS (X-ray Photoemission Spectroscopy) system. High resolution spectra of the $O_{1s}$ transition (characterizing the distribution of oxygen chemical species in the detected volume of the near surface region of the sample) were collected at an angle of 85° between the detector axis and the surface normal. Spectra collected in this manner are sensitive to only the first few monolayers of the surface of the bulk sample. The $O_{1s}$ spectrum, shown in FIG. 2A, is thus representative of the distribution of oxygen containing species present in the first few monolayers of the E-glass surface as it emerges from the melt and is cooled in ambient air. In order to determine the effect on the distribution of oxygen containing species on the surface of the E-glass sample, this analysis procedure was repeated with two additional surface treatments. Treatment #1 consisted of heating the wafer to 815° C. for 30 min. in ambient air; transferring the hot wafer to the chamber of a Harrick Scientific Corp. model POC-32G plasma generator; evacuating the chamber to 0.015 Torr.; backfilling the chamber with water vapor from an external water reservoir maintained at 50° C.; adjusting the pressure in the chamber of the plasma generator so as to just prevent extinguishing the plasma at a power level of 100 watts while continuously pumping the chamber and exposing the surface of the wafer to the plasma for various periods of time prior to removal for analysis by XPS. FIG. 3C, shows the $O_{1s}$ spectrum of plasma treated sample held in contact with the plasma for 15 min. Quantitative analysis of the increase in the surface hydroxyl density produced by the plasma treatment was carried out by curve fitting the $O_{1s}$ spectrum of FIG. 3C using the data of FIG. 2A to correct for the species present in the original surface prior to the plasma treatment. Table 1 shows that the surface hydroxyl density on the glass surface has been increased relative to the sample cooled in ambient air. Treatment #2 consisted of removing the sample from the furnace at 815° C. after 30 min. and quenching the wafer to room temperature using an ultra sonic atomized water spray prior to analysis by XPS as before. FIG. 3B shows the resulting $O_{1s}$, spectrum of the E-glass surface and Table 1 summarizes the corresponding change in the surface hydroxyl density calculated from these data using the same analysis methodology. It is clear from the data of Table 1 that the plasma treatment significantly enhances the surface hydroxyl density relative to both the air cooled and water quenched surface treatments.

Figure 3:
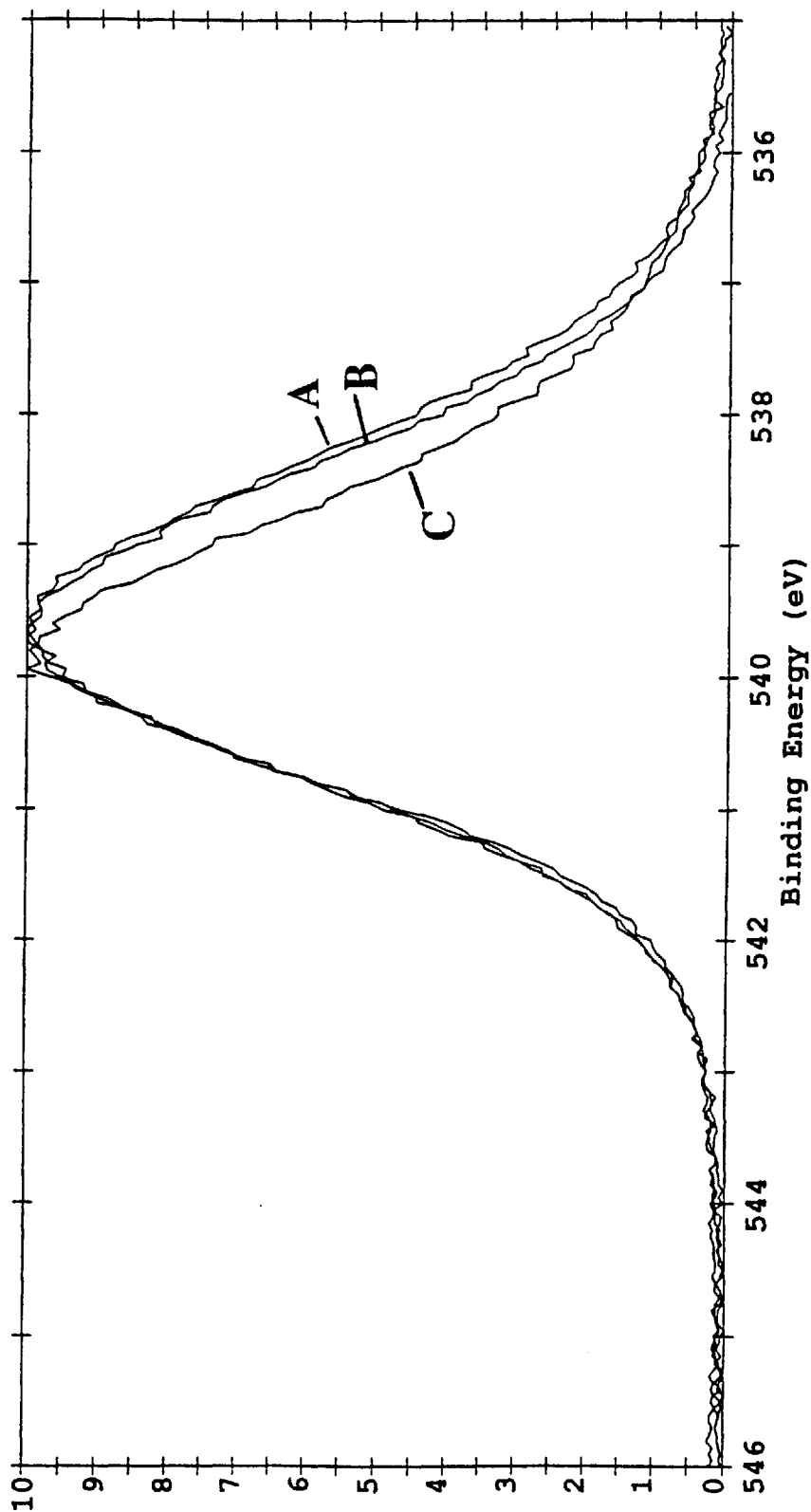
FIG. 3 depicts the x-ray photoemission $O_{1S}$ spectra of a glass wafer with three different surface treatments.

FIG. 3 depicts the X-ray Photoemission $O_{1s}$, spectra of an E-glass wafer with three different surface treatments. FIG. 3A is for an E-glass surface cooled to room temperature from 815° C. in air. FIG. 3B is for the same E-glass quenched to room temperature from 815° C. in an atomized water spray. FIG. 3C is for the same E-glass surface after the plasma treatment of this invention.

Table 1 depicts the results of quantitative analysis of the spectra of FIG. 3 for the change in the surface hydroxyl density of the E-glass surface after the plasma treatment of this invention as compared to typical surface treatments of the E-glass surface used in the production of continuously drawn E-glass fiber.

TABLE 1

| Sample | Increase in surface hydroxyl concentration relative to air cooled surface |
|--------|---------------------------------------------------------------------------|
| A      | 0                                                                         |
| B      | 5.1%                                                                      |
| C      | 47.9%                                                                     |

What is claimed is:

1. A process for increasing the number density of hydroxyl groups on a clean glass surface comprising contacting said surface with a radio frequency induced gas plasma containing water vapor.

2. The process of claim 1 wherein said plasma is at least about 30% saturated with water vapor.

3. The process of claim 2 wherein said plasma is at least 50% saturated with water vapor.

4. The process of claim 1 wherein said gas comprises air.

5. The process of claim 1 wherein said glass comprises glass fibers.

6. The process of claim 1 wherein said contacting takes place at a temperature in the range of about 20° C. to 100° C.

7. The process of claim 6 wherein said temperature is about 25° C.

8. A hydroxyl group—containing glass surface prepared by the process of claim 1.

* * * * *